Patented Oct. 26, 1943

2,332,636

UNITED STATES PATENT OFFICE 2,332,636

PAINT COMPOSITION

Wasson O. Hose, Cleveland, Ohio, and Paul Zurcher, Ponca City, Okla., assignors to Patterson-Sargent Company, Cleveland, Ohio, a corporation of Ohio, and Continental Oil Company, Ponca City, Okla., a corporation of Delaware No Drawing. Application June 26, 1940, Serial No. 342,562

3 Claims. (Cl. 260—40)

This invention relates in general to a paint composition and in particular to a new and improved green paint of unusual stability.

The fabrication of color stable green paints of brilliant hue is extremely difficult and so far as we know has never been accomplished. Brilliant green paints of various kinds have been manufactured and sold for many years, but the one outstanding defect of all of these brilliant green paints has been their color instability in commercial use. The green paints commonly found on the market have a tendency to fade or change to a blue or yellow color or in other respects prove commercially unsatisfactory. This is particularly true of green paints exposed to the various vapors encountered in a petroleum refinery and chemical industries, namely, acid and alkaline vapors. The ultra-violet rays of the sun and other atmospheric conditions have been found to affect these green paints more strongly than paints of other colors.

Therefore an object of the present invention is to produce brilliant green paints of various shades and of outstanding color stability.

Another object is to produce green paints that will not change to blue or yellow upon exposure.

Still another object of the invention is to produce green paints of outstanding stability particularly suited for use in a petroleum refinery or a chemical plant.

Still other objects will be obvious from the full consideration of the description of our improved paint.

The pigments of the green paints now on the market may be of different chemical nature; for example, one type of brilliant green paint contains lead chromate and ferroferricyanide as pigments. Still other pigments used in green paints are chromium oxide or chromium hydrate, which are very stable toward chemical attack but of a very dull, unattractive shade.

Our invention relates particularly to the blending of pigments for the production of stable, brilliant green paints. Briefly stated, our invention comprises the discovery that the blending of an acid-resistant yellow pigment and an alkali-resistant blue pigment gives an acid and alkali-resistant green paint of unexpected and outstanding properties, including long color stability life.

When green paints of a common type containing a chromate yellow pigment and an "iron blue" pigment are exposed to strong sunshine, the ultraviolet rays cause the ferroferricyanide of the "iron blue" to fade, so that after a certain time the pure green shade is changed into a greenish-yellow.

Many have tried to produce a more stable brilliant green by reinforcing the vehicle of the paint with synthetic resins or by replacing all of the vegetable or animal oil in the paint, such as linseed oil, tung oil, fish oil, with entirely synthetic vehicles, endeavoring to create a more resistant surface which would protect the pigments against the attack of chemicals. The improvements from such a change were extremely slight, the penetration of the harmful chemicals being delayed to a very small extent.

It is well known that in many industrial applications, and in localities adjacent various industries, paints are subjected to vapors of various kinds, including acid and alkali vapors, and these frequently modify the color of the paints or cause disintegration thereof, or both. This is particularly true of green paints commonly in use. In certain locations the green paints tend to turn blue, and in others they tend to turn a yellowish color in a relatively short time.

There has been a long-felt need for a brilliant, stable green paint which is suitable for universal use, i. e. in locations where it may be subjected to acid or alkali vapors or to strong sunlight. We have found that by the use of a blend of pigments, at least one comprising a phthalocyanine blue, preferably copper phthalocyanine, and another comprising a yellow dye carried by finely divided inorganic substances, and commonly designated "Hansa yellow," a paint is obtained which is stable even though subjected to acid or alkali vapors.

The best yellow pigments for our purpose are precipitates on inorganic substances of azo dyes of the following types:

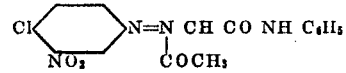

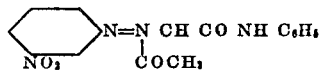

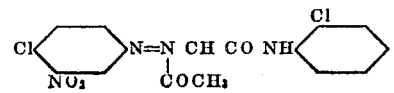

in which the hydrogen atoms in the benzene rings may be substituted by halogens, such as chlorine, or by radicals, such as $NO_2$, $SO_3$, and other groups of atoms generally used for producing different color shades.

Hansa yellow is a commercial name for an organic yellow which is made by diazotizing amino compounds, such as meta-nitro-para-toluidine and coupling with second components, such as acetoacetanilide.

A paint of this composition is unaffected by acid fumes, as evidenced by large-scale exposure for several years in an area where all greens containing ferroferricyanide and lead or zinc chromate as pigments turned completely blue in less than one week.

In a paint intended for use in an alkaline surrounding in which green paints of usual composition are changed to yellow we may replace the commonly used ferroferricyanide with a pigment which resists the attack by alkaline substances. Such pigments are characterized by the phthalocyanine structure in which the outer hydrogen atoms of the four benzene nuclei may be replaced by sulfonic acid, phenyl, nitro, amino, azo, and similar groups. The two central hydrogen atoms of the phthalocyanine structure may be replaced by metals such as copper, cobalt, nickel, manganese, and others. These compounds may also be halogenated to various degrees, replacing one, several, or all of the outer hydrogen atoms of the four benzene rings with chlorine or other halogens. Such compositions are of outstanding resistance to the attack by acids, alkalis, as well as to the effect of ultraviolet rays.

If a green paint is likely to be exposed alternately to the influence of alkalis and acids, under which conditions both pigments, the ferroferricyanide as well as the chromates are destroyed, we replace the ferroferricyanide with a blue of the phthalocyanine type not affected by either alkalis or acids, and we substitute an azo type yellow, as specified above, for the chromate or chromates. This yellow will resist attack by acid fumes.

The percentages of the azo type yellows and of phthalocyanine blues in paints of the present invention which are able to resist acids as well as alkalies may be varied considerably in order to obtain the desired shades.

The following is an example of a paint embodying the present invention:

| | Per cent by weight |
|---|---|
| Pigment | 9 |
| Vehicle | 91 |
| | 100 |

*Pigment*

| | Per cent by weight |
|---|---|
| Copper phthalocyanine base blue (Monastral blue) | 31 |
| Acid-proof yellow lake of azo dye (Hansa yellow) | 69 |

*Vehicle composition*

| | Per cent by weight |
|---|---|
| Glycerol phthalate resins solids | 42.50 |
| Hydrocarbons | 57.00 |
| Lead and cobalt as metal | .50 |
| | 100.00 |

It is to be understood that the vehicle and resinous materials in the above example may be substituted by other vehicles and resins familiar to those skilled in the art, and also that the proportions and ratios of the pigments may be varied to obtain the desired shades, densities of color, and the like. Other pigments may also be included.

We claim:

1. An acid and alkali-resistant green paint comprising a blend of copper phthalocyanine blue pigment and Hansa yellow in a vehicle.

2. An acid and alkali-resistant green paint comprising a blend of copper phthalocyanine blue pigment and finely divided, inorganic particles carrying Hansa yellow dye in a suitable vehicle.

3. An acid and alkali-resistant green paint comprising a blend of copper phthalocyanine blue pigment and Hansa yellow in an alkyd resin vehicle.

WASSON O. HOSE.
PAUL ZURCHER.